United States Patent
Sherman et al.

(10) Patent No.: US 6,179,223 B1
(45) Date of Patent: Jan. 30, 2001

(54) SPRAY NOZZLE FLUID REGULATOR AND RESTRICTOR COMBINATION

(75) Inventors: Richard Sherman, Troy; Jerry VerHoven, Sterling Heights, both of MI (US)

(73) Assignee: Illinois Tool Works, Glenview, IL (US)

( * ) Notice: Under 35 U.S.C. 154(b), the term of this patent shall be extended for 0 days.

(21) Appl. No.: 09/397,461

(22) Filed: Sep. 16, 1999

(51) Int. Cl.$^7$ ............................... B05B 9/00; B05B 1/30
(52) U.S. Cl. ..................... 239/124; 239/533.1; 239/570
(58) Field of Search ................... 239/124, 533.1, 239/570; 251/121, 120; 137/505, 613

(56) References Cited

U.S. PATENT DOCUMENTS

| | | |
|---|---|---|
| 577,522 | 2/1897 | Wallwork . |
| 1,133,320 | 3/1915 | Rockwood . |
| 1,489,310 | 4/1924 | Critchlow . |
| 1,732,897 | 10/1929 | Kobash ............................ 251/149.7 |
| 1,794,955 | 3/1931 | Gordon . |
| 1,812,922 | 7/1931 | Bramsen et al. . |
| 2,461,766 | 2/1949 | Peeps ..................................... 222/146 |
| 2,489,338 | 11/1949 | Stork et al. .......................... 285/122 |
| 2,511,396 | 6/1950 | Brekke ................................... 285/177 |
| 2,513,081 | 6/1950 | Clark et al. .......................... 299/140 |
| 2,548,528 | 4/1951 | Hansen ................................... 284/19 |
| 2,807,502 | 9/1957 | Tharp ...................................... 299/76 |
| 3,083,725 | 4/1963 | Moen ................................. 137/454.2 |
| 3,104,088 | 9/1963 | Cator ................................. 251/149.6 |
| 3,106,346 | 10/1963 | Thomas ................................. 239/366 |
| 3,177,018 | 4/1965 | Goodwin .............................. 285/277 |
| 3,230,964 | 1/1966 | Debrotnic et al. ................. 251/149.5 |
| 3,312,243 | 4/1967 | Booker ................................. 137/609 |
| 3,515,355 | 6/1970 | Wagner ................................. 239/526 |
| 3,537,652 | 11/1970 | Pearl ...................................... 239/525 |
| 3,538,950 | 11/1970 | Porteners .............................. 137/608 |
| 3,585,803 | 6/1971 | Bardgette .............................. 285/308 |
| 3,606,168 | 9/1971 | Seaman, Jr. ......................... 239/597 |
| 3,606,170 | 9/1971 | Hoffman et al. ...................... 239/414 |
| 3,712,336 | 1/1973 | Bell, Jr. ................................. 137/613 |
| 3,720,373 | 3/1973 | Levey .................................... 239/127 |
| 3,743,188 | 7/1973 | Wagner ................................. 239/575 |
| 3,760,836 | 9/1973 | Albanese .............................. 137/360 |
| 4,106,699 | * 8/1978 | Holt ...................................... 239/124 |
| 4,114,853 | 9/1978 | Medvick ............................ 251/149.6 |
| 4,177,832 | 12/1979 | Price ................................. 137/625.47 |

(List continued on next page.)

FOREIGN PATENT DOCUMENTS

| | | |
|---|---|---|
| 39 22 863 C1 | * 10/1990 | (DE) . |
| 818818 | * 8/1959 | (GB) . |
| 4-135664 | * 5/1992 | (JP) . |

OTHER PUBLICATIONS

AccuSpray, Inc., *Operation and Care Manual Series 12 Low Pressure Spray Gun*, Copyright 1992, pp. 10–11, 16–17.*
Graco Inc., *High Efficiency Low Pressure HVLP Spray Gun*, Copyright 1991, pp. 1–16.*
ITW DeVilbiss, *HGS Stainless Steel Fluid Regulators*, Service Bulletin SB–6–403–F, Copyright 1997.*
ITW Hosco, *From Ball Valve To Gun, Hosco Is The One* brochure, Copyright 1997.*

Primary Examiner—Andres Kashnikow
Assistant Examiner—Davis Hwu
(74) Attorney, Agent, or Firm—Harness. Dickey & Pierce, P.L.C.

(57) ABSTRACT

A spray nozzle fluid regulator and restrictor combination for controlling fluid supplied to a spray nozzle used in a fluid supply system includes a pressure regulator portion and a fluid restrictor portion. The pressure regulator portion controls a fluid pressure of the fluid supplied to the spray nozzle. The fluid restrictor portion controls the flow rate of the fluid supplied to the spray nozzle. The pressure regulator portion and the fluid restrictor portion are formed as a single assembly with the fluid restrictor portion being positioned substantially adjacent to the pressure regulator portion to increase the overall responsiveness of the pressure regulator portion.

20 Claims, 4 Drawing Sheets

U.S. PATENT DOCUMENTS

| | | | |
|---|---|---|---|
| 4,184,507 | 1/1980 | Richards | 137/375 |
| 4,442,003 | 4/1984 | Holt | 210/445 |
| 4,564,221 | 1/1986 | Ishii | 285/239 |
| 4,573,498 | 3/1986 | Ludwig | 137/625.47 |
| 4,583,711 | 4/1986 | Johnson | 251/149.6 |
| 4,643,336 | 2/1987 | Mandeville et al. | 222/145 |
| 4,747,626 | 5/1988 | Hama et al. | 285/308 |
| 4,760,956 | 8/1988 | Mansfield | 239/8 |
| 4,825,897 | 5/1989 | Shade | 137/271 |
| 4,834,423 | 5/1989 | DeLand | 285/39 |
| 4,895,395 | 1/1990 | Ceriani | 285/39 |
| 4,911,203 | 3/1990 | Garms | 137/614.04 |
| 4,979,765 | 12/1990 | Bartholomew | 285/93 |
| 5,060,861 * | 10/1991 | Holt | 239/124 |
| 5,078,322 * | 1/1992 | Torntore | 239/289 |
| 5,096,235 * | 3/1992 | Oetiker | 285/308 |
| 5,100,060 * | 3/1992 | Haferkorn | 239/337 |
| 5,143,409 * | 9/1992 | Lalikos | 285/116 |
| 5,161,834 * | 11/1992 | Norkey | 285/319 |
| 5,173,031 * | 12/1992 | Nonnenmacher et al. | 417/218 |
| 5,178,326 * | 1/1993 | Kukesh et al. | 239/8 |
| 5,180,104 * | 1/1993 | Mellette | 239/8 |
| 5,195,680 * | 3/1993 | Holt | 239/124 |
| 5,236,129 * | 8/1993 | Grime et al. | 239/528 |
| 5,248,168 * | 9/1993 | Chichester et al. | 285/49 |
| 5,286,068 * | 2/1994 | Wiebe | 285/114 |
| 5,291,928 * | 3/1994 | Keith, Jr. et al. | 144/371 |
| 5,295,626 * | 3/1994 | Mirabito | 239/526 |
| 5,395,054 * | 3/1995 | Wheeler | 239/526 |
| 5,472,242 * | 12/1995 | Peteresen | 285/93 |
| 5,501,397 * | 3/1996 | Holt | 239/124 |
| 5,553,895 * | 9/1996 | Karl et el. | 285/39 |
| 5,857,622 * | 1/1999 | Holt | 239/124 |

\* cited by examiner

SPRAY NOZZLE FLUID REGULATOR AND RESTRICTOR COMBINATION

BACKGROUND OF THE INVENTION

1. Field of the Invention

This invention relates generally to a recirculating paint supply system, and more particularly, to a spray nozzle fluid regulator and restrictor combination for use in a recirculating or non-recirculating paint supply system.

2. Discussion of the Related Art

Recirculating paint supply systems conventionally comprise a mixing tank equipped with suitable agitation for maintaining a liquid coating composition uniformly mixed and a pump for transferring the liquid coating composition under a desired pressure through a supply line to a spray gun. Such recirculating type paint systems are in widespread commercial use for keeping heavily-bodied pigments uniformly suspended in the liquid coating composition to thereby assure uniform conformity in the color and quality of the paint layer applied to a surface substrate, such as an automobile. A suitable return hose is also provided for returning the excess quantity of liquid coating composition back to the mixing tank for recirculation and to keep the paint in suspension. A typical recirculating paint supply system is shown in U.S. Pat. No. 5,060,861, which is hereby incorporated by reference.

Some of these paint supply systems will also include a flow control device or paint restrictor at the junction between the supply hose and the spray nozzle of the spray gun. This type of flow control device regulates fluid flow by creating a pressure drop through an orifice in the device. An exemplary embodiment of such a flow control device is set forth in U.S. Pat. No. 4,106,699, which is hereby incorporated by reference. While this type of flow control device works well for maintaining a substantially constant flow rate of the liquid coating composition to the spray nozzle, this type of flow control device also exhibits some disadvantages. For example, should the supply line pressure vary or be pulsating, possibly due to the use of a reciprocating piston type pump, a fluctuation in the flow rate out of the spray nozzle may occur, thereby possibly effecting the quality of the paint finish. In addition, since this type of device does not have a closing valve, pressure may build up between this device and the spray gun. In which case, when the spray gun is actuated, a stream or spit of non-atomized paint may exit the spray gun.

Other paint supply systems may control the fluid pressure in the supply line directly through the use of a diaphragm-type pressure regulator. Such regulators are generally able to compensate for any pulsation due to the modulation of an internal diaphragm. However, due to the corrosive nature of the solvents currently being used in the paint industry, rubber/mylar type diaphragms are no longer an option, which thereby requires that a teflon type diaphragm be used. These diaphragms are generally much stiffer and less responsive than a typical rubber/mylar diaphragm. Because of this, when a spray nozzle is turned off, the diaphragm does not react quickly enough to close the supply to the spray gun, thereby enabling a pressure to build between the regulator and the spray gun. When the spray gun is again actuated, the liquid coating composition exits the spray nozzle at a much higher pressure, sometimes as high as the line pressure, which does not allow the liquid coating composition to become atomized as it initially exits the spray nozzle. This non-atomized paint will again generally effect the overall quality of the paint finish.

Other paint supply systems have also employed the use of a pressure regulator at the bulk head or connection to a spray station, which is generally a very large and expensive regulator and a flow control device at the coupling to the spray gun. Here again, this configuration also has several disadvantages. In this regard, the pressure regulator generally employed is very costly and large. Additionally, with the regulator being adjacent to the bulk head, there is generally a great deal of supply conduit or hose between the regulator and the spray nozzle. Because of this, when the spray gun is turned off, pressure will build between the regulator and the spray nozzle before the regulator fully closes. This will generally cause the volume of paint between the regulator and the spray gun to exit the spray nozzle in a non-atomized state.

What is needed then is a spray nozzle fluid regulator and restrictor combination which does not suffer from the above-mentioned disadvantages. This, in turn, will reduce the cost for providing a constant flow and pressure control, reduce the pressure build-up between the pressure regulator and the spray gun, reduce or eliminate the amount of non-atomized paint exiting the spray nozzle upon initial actuation, provide a substantially uniform flow rate at varying supply line pressures or at pulsating supply line pressures, increase the overall uniformity and quality of paint finishes, and improve the overall performance and responsiveness of the system to control flow rate and spray pressure. It is, therefore, an object of the present invention to provide such a spray nozzle fluid regulator and restrictor combination for use in a recirculating paint supply system.

SUMMARY OF THE INVENTION

In accordance with the teachings of the present invention, a fluid regulator and restrictor combination for controlling fluid supplied to a spray nozzle used in a fluid supply system is disclosed. The fluid regulator and restrictor combination includes a pressure regulator portion and a fluid restrictor portion located substantially adjacent to one another. This enables the pressure regulator portion to control the fluid pressure and the fluid regulator portion to control the flow rate such that fluid restrictor portion increases the overall responsiveness of the pressure regulator portion.

In one preferred embodiment, a fluid regulator and restrictor combination for controlling fluid supplied to a spray nozzle used in a fluid supply system includes a pressure regulator portion and a fluid restrictor portion. The pressure regulator portion controls a fluid pressure of the fluid supplied to the spray nozzle. The fluid restrictor portion controls the flow rate of the fluid supplied to the spray nozzle. The pressure regulator portion and the fluid restrictor portion are formed as a single assembly with the fluid restrictor portion being positioned substantially adjacent to the pressure regulator portion, whereby the fluid restrictor portion increases the overall responsiveness of the pressure regulator portion.

In another preferred embodiment, a fluid regulator and restrictor combination for controlling fluid supplied to a spray nozzle used in a fluid supply system also includes the pressure regulator portion and the fluid restrictor portion. Here again, the pressure regulator portion controls the fluid pressure of the fluid supplied to the spray nozzle. The fluid restrictor portion controls the flow rate of the fluid supplied to the spray nozzle. The pressure regulator portion and the fluid restrictor portion are formed as a single assembly with the fluid restrictor portion being positioned downstream from the pressure regulator portion and substantially adjacent to the pressure regulator portion. The fluid restrictor thereby creates a back pressure downstream from the pressure regulator portion to increase the overall responsiveness of the pressure regulator portion.

In yet another preferred embodiment, a recirculating fluid supply system for supplying fluid to a spray nozzle includes a supply line, a return line, and a fluid regulator and restrictor combination. The supply line supplies fluid to the supply nozzle and the return line returns excess fluid supplied to the spray nozzle. The fluid regulator and restrictor combination includes a supply port in communication with the supply line, a return port in communication with the return line, and an outlet port in communication with the spray nozzle. The supply port is operable to receive fluid in excess of that supplied to the spray nozzle. The return port is operable to return excess fluid supplied to the spray nozzle and the outlet port is operable to supply the fluid to the spray nozzle. A pressure regulator portion is in communication with the supply and return ports and is operable to control a fluid pressure of the fluid supplied to the spray nozzle. A fluid restrictor portion is in communication with the pressure regulator portion and the outlet port. The fluid restrictor portion is operable to control a flow rate of the fluid supplied to the spray nozzle. The pressure regulator portion and the fluid restrictor portion are formed as a single assembly with said fluid restrictor portion being positioned downstream from said pressure regulator portion and substantially adjacent thereto. The fluid restrictor portion creates a back pressure between the pressure regulator portion and the fluid restrictor portion that increases the overall responsiveness of the pressure regulator portion.

Use of the present invention provides a fluid regulator and restrictor combination for controlling fluid supplied to a spray nozzle used in a fluid supply system. As a result, the aforementioned disadvantages associated with the currently available individual pressure and fluid control devices used in fluid supply systems have been substantially reduced or eliminated.

BRIEF DESCRIPTION OF THE DRAWINGS

Still other advantages of the present invention will become apparent to those skilled in the art after reading the following specification and by reference to the drawings in which:

FIG. 9 is a top cut-away view of the spray nozzle fluid regulator and restrictor combination with the cut-away portions exposing fluid paths.

DETAILED DESCRIPTION OF THE PREFERRED EMBODIMENT(S)

The following description of the preferred embodiment concerning a spray nozzle fluid regulator and restrictor combination for use in a recirculating paint supply system is merely exemplary in nature and is not intended to limit its application or use. Moreover, those skilled in the art will recognize that this device may be adjusted with manual or automated adjustment mechanisms and may be used with recirculating or non-recirculating fluid supply systems for transporting any type of fluid.

Figure 1:
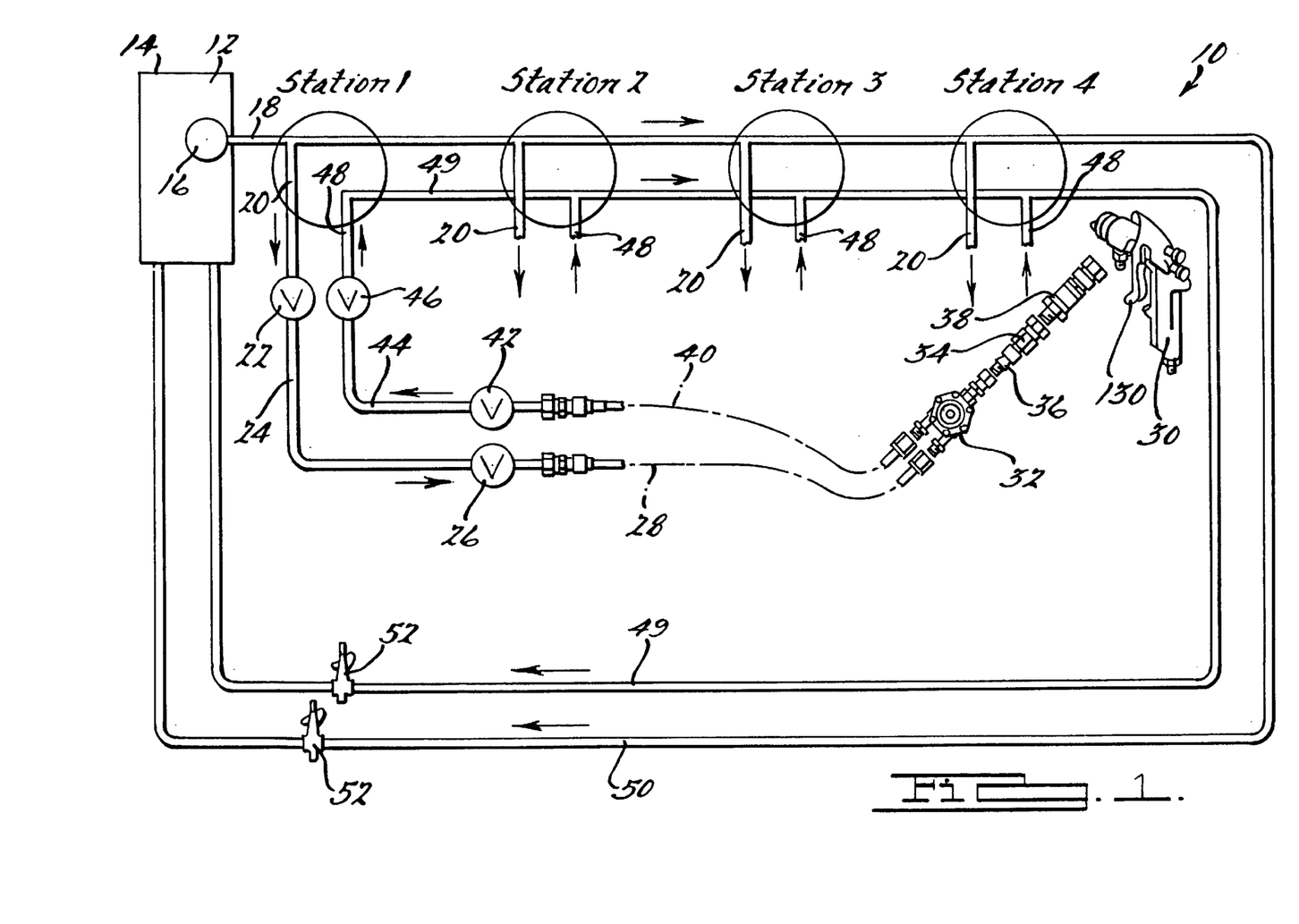
FIG. 1 is a schematic view of a multiple spray station arrangement of a recirculating paint supply system employing the preferred embodiment of the present invention.

A multiple station recirculating paint supply system 10 which employs the preferred embodiment of the present invention is shown in FIG. 1. The recirculating paint supply system 10 is illustrated as having four (4) separate stations, each provided with a pressurized paint supply line and pressurized paint return line. It will further be appreciated that the paint supply system 10 is not limited to merely four (4) stations, but may be duplicated numerous times to provide for a plurality of different coating compositions and/or a plurality of different colors, such that each spray station may include, for example, twelve (12) different systems to supply twelve (12) different colors of a desired liquid coating composition. However, the recirculating paint supply system illustrated in FIG. 1 identifies only a single recirculating paint supply for each station for exemplary purposes only.

The recirculating paint supply system 10 includes a supply tank 12 located within a mixing room 14. The mixing room 14 further includes a supply pump 16 used for supplying the liquid coating composition stored within the supply tank 12 under pressure to a main supply header 18. A supply branch line 20 is located at each spray station and is connected to the supply header 18 which, in turn, is connected to a main shut-off valve 22, located before each spray station entry. This shut-off valve 22 is preferably a rotatable ball valve, such as that disclosed in U.S. Pat. No. 5,857,622, which is hereby incorporated by reference. Each shut-off valve 22 is further connected or coupled to a supply conduit or line 24 which provides the supply of liquid coating composition to the inside of each spray station. The supply conduit 24 is connected to or in communication with a second shut-off valve 26 which is located at the inside of the spray station wall as the supply conduit line 24 enters the spray station. From the second shut-off valve 26, a supply hose 28 is connected which may be several feet in length, for example, the supply hose is generally about twenty five (25) feet in length. The supply hose 28 supplies a spray nozzle of a spray gun 30 through a variety of coupling devices, shown more clearly in FIG. 2.

Figures 2, 3, 4:
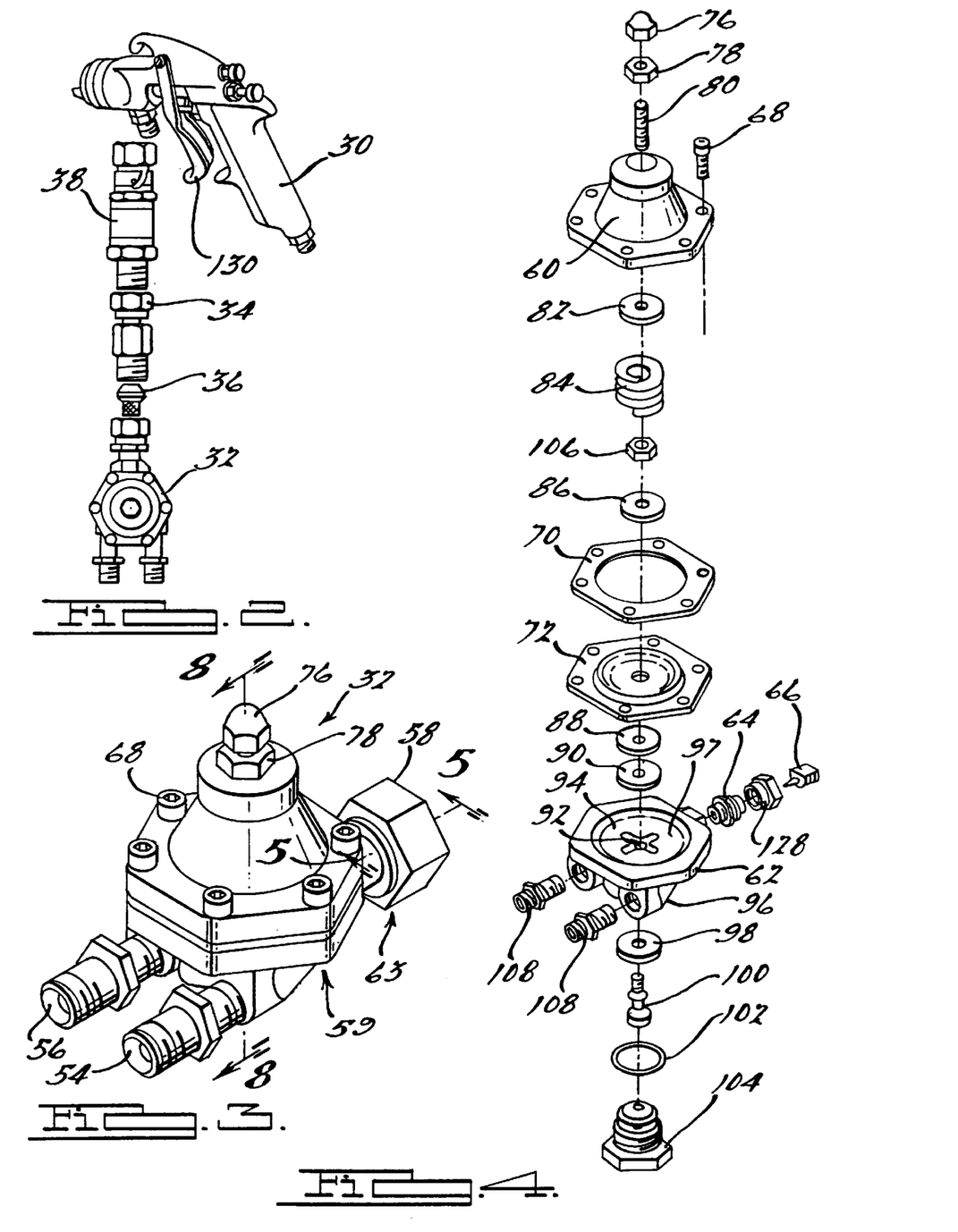
FIG. 2 is a side elevational view of a typical air atomizing type spray gun employing the preferred embodiment of the present invention.
FIG. 3 is a perspective view of a spray nozzle fluid regulator and restrictor combination according to the teachings of the preferred embodiment of the present invention.
FIG. 4 is an exploded perspective view of the spray nozzle fluid regulator and restrictor combination.
Figure 4:
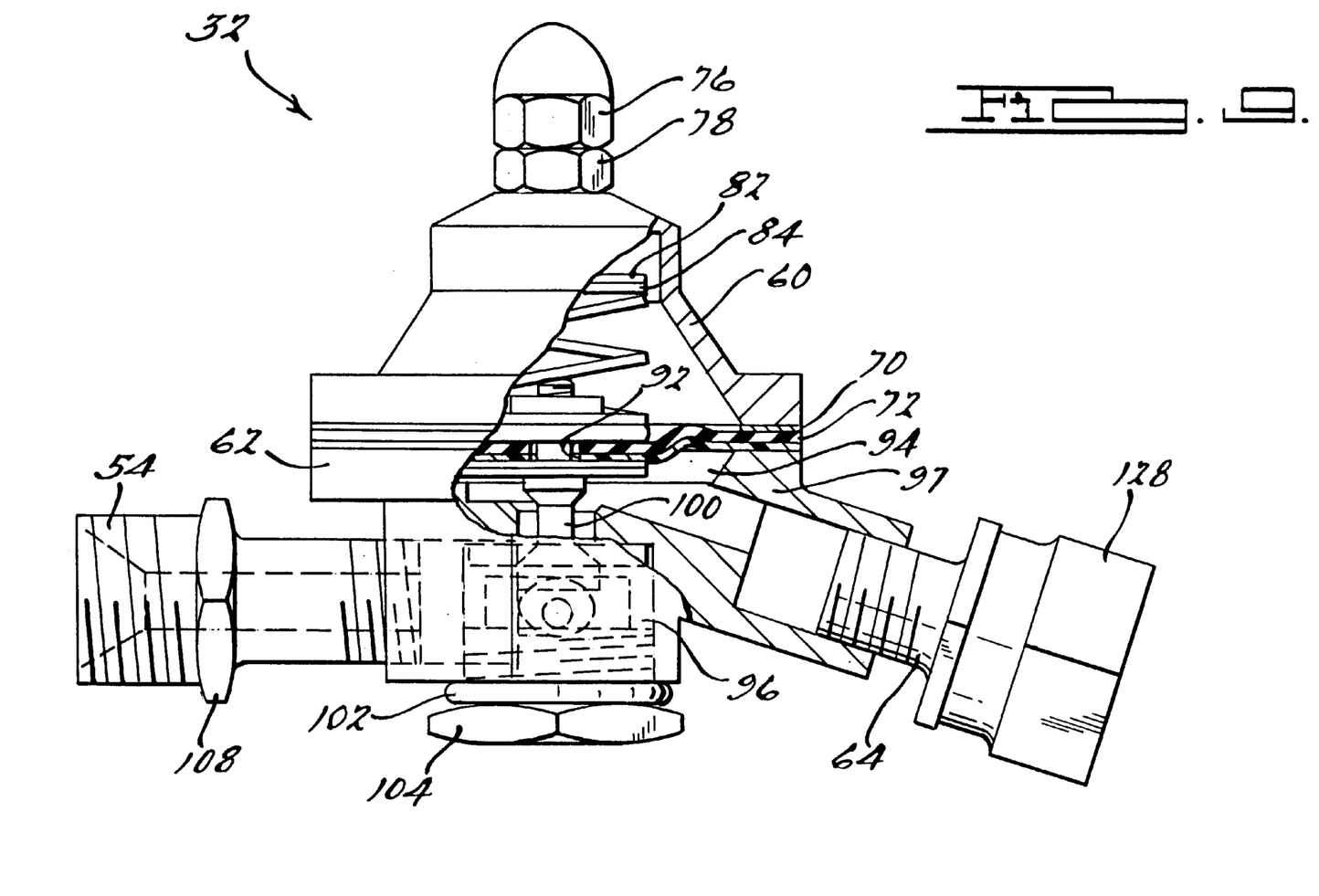

The supply hose 28 is coupled to the fluid regulator and restrictor combination 32 which is operable to control both the flow rate and supply pressure of the fluid to the spray gun 30, further discussed herein. The recirculating paint supply system 10 further preferably includes a swivel connector assembly 34 disposed in-line with the fluid regulator and restrictor combination 32 that enables the spray gun 30 to be rotated relative to the supply hose 28. Coupled to the swivel connector assembly 34 is a filter assembly 36 and a quick disconnect assembly 38. The swivel assembly 34, filter assembly 36 and quick disconnect assembly 38 are preferably similar to the corresponding assemblies set forth in U.S.

Pat. No. 5,857,622, which is hereby incorporated by reference or any other appropriate swivel, filter and quick disconnect assembly. From the quick disconnect assembly 38, the liquid coating composition is supplied to a conventional air atomized spray nozzle or gun 30.

The quantity of liquid coating composition or paint supplied through the supply header 18, supply branch line 20, supply conduit 24 and supply hose 28 is in excess of that required at the spray gun 30. Thus, the balance thereof is returned to the supply tank 12 in the mixing room 14, via a return hose 40, which is in communication with a shut-off valve 42, also located at the spray station wall. It should further be noted that the shut-off valve 26 and shut-off valve 42 may be replaced with an H-connector assembly, such as that shown in U.S. Pat. No. 5,857,622, which is hereby incorporated by reference. From the valve 42, a return conduit 44 extends to a second return shut-off valve 46 which is coupled to a return branch line 48. Each return branch line 48 is coupled to a low pressure return header 49. The quantity of paint supplied through the main supply header 18 is also in excess of that required at the multiple spray stations and the balance thereof is also returned to the supply tank 12 within the mixing room 14 by way of a high pressure return header 50. Both the high pressure return header 50 and the low pressure return header 49 are optionally equipped with back pressure regulators 52. In accordance with the recirculating paint supply system 10 disclosed herein, a continuous supply of substantially uniformly mixed liquid coating composition of paint is supplied to each spray station in excess of that required at each spray gun 30. Thus, the quantity of excess is continuously returned from each spray station, via the low pressure return header or line 49 and from the high pressure return header or line 50. The returned liquid coating composition is subsequently recirculated to the supply tank 12 for remixing and reblending and subsequent recirculation back through the system 10.

Turning now to FIGS. 3 and 4, the fluid regulator and restrictor combination 32 according to the teaching of the preferred embodiment of the present invention is shown in further detail. The fluid regulator and restriction combination 32 includes a supply port 54, a return port 56, and an outlet port 58. The supply port 54 is in communication with the supply hose 28, the return port 56 is in communication with the return hose 40, and the outlet port 58 is in communication with the spray gun 30. In other words, the liquid coating composition is recirculated via the supply and return ports 54 and 56 and also fed to the spray gun 30, via outlet port 58. The fluid regulator and restrictor combination 32 consists of two portions, the first portion being a pressure regulator portion 59 formed from a bonnet 60 and regulator body 62 and a flow restrictor portion 63 formed from a restrictor body 64 and valve needle 66. The bonnet 60 is sealably secured to the regulator body 62 by way of a plurality of cap screws 68, along with a gasket 70 and a teflon diaphragm 72.

To reduce the fluid inlet pressure or line pressure from the supply header 18 which ranges between about 50 psi (pounds per square inch) to about 300 psi to a regulated fluid pressure at the supply gun 30 which ranges between about 2 psi to about 100 psi, the pressure regulator portion 59 includes a pressure adjustment mechanism 74. The pressure adjustment mechanism 74, shown herein, is a manual adjustment mechanism, however, tamper proof adjustment mechanisms or automated air control adjustment mechanisms may also be employed, as is known in the art. The pressure adjustment mechanism 74 includes a cap nut 76, a lock nut 78 and an adjustment screw 80. The adjustment screw 80 applies pressure to an adjustment seat 82 which regulates the tension on a regulator spring 84. This provides a downward pressure, via an upper plate 86 location on the diaphragm 72. By rotating the adjustment screw 80, the downward force applied to the diaphragm 72 is controlled to adjust the regulated pressure at the output port 58. To regulate the fluid pressure, the cap nut 76 is removed and the lock nut 78 is loosened while the adjustment screw 80 is rotated, via a hex head drive. Upon turning the set screw 80 clockwise, the outlet fluid pressure is increased. Upon turning the set screw 80 counterclockwise, the outlet fluid pressure is decreased.

Positioned on the fluid side of the regulator portion 59 is a teflon washer 88 and a flat washer 90 which are each positioned between the teflon diaphragm 72 and the regulator body 62. The regulator body 62 is separated into a supply chamber 94 and a recirculating chamber 96 by means of a separating wall 97 defining a valve opening 92. Positioned within the recirculating chamber 96 is a valve mechanism formed by a teflon valve seat 98 and a valve stem 100. The recirculating chamber 96 is sealed by way of an o-ring 102 and a threaded plug 104. The valve stem 100 is coupled to the flexible diaphragm 72, via a hex nut 106. As the flexible diaphragm 72 modulates or flexes in response to changes in pressure, the valve stem 100 correspondingly moves axially relative to the inlet opening 92, thereby controlling the fluid pressure at the outlet port 58. Also coupled to the recirculating cavity 96 are threaded connectors 108 which threadably mate the supply and return hoses 28 and 40 with the supply and return ports 54 and 56, respectively.

Figures 5, 6, 7, 8:
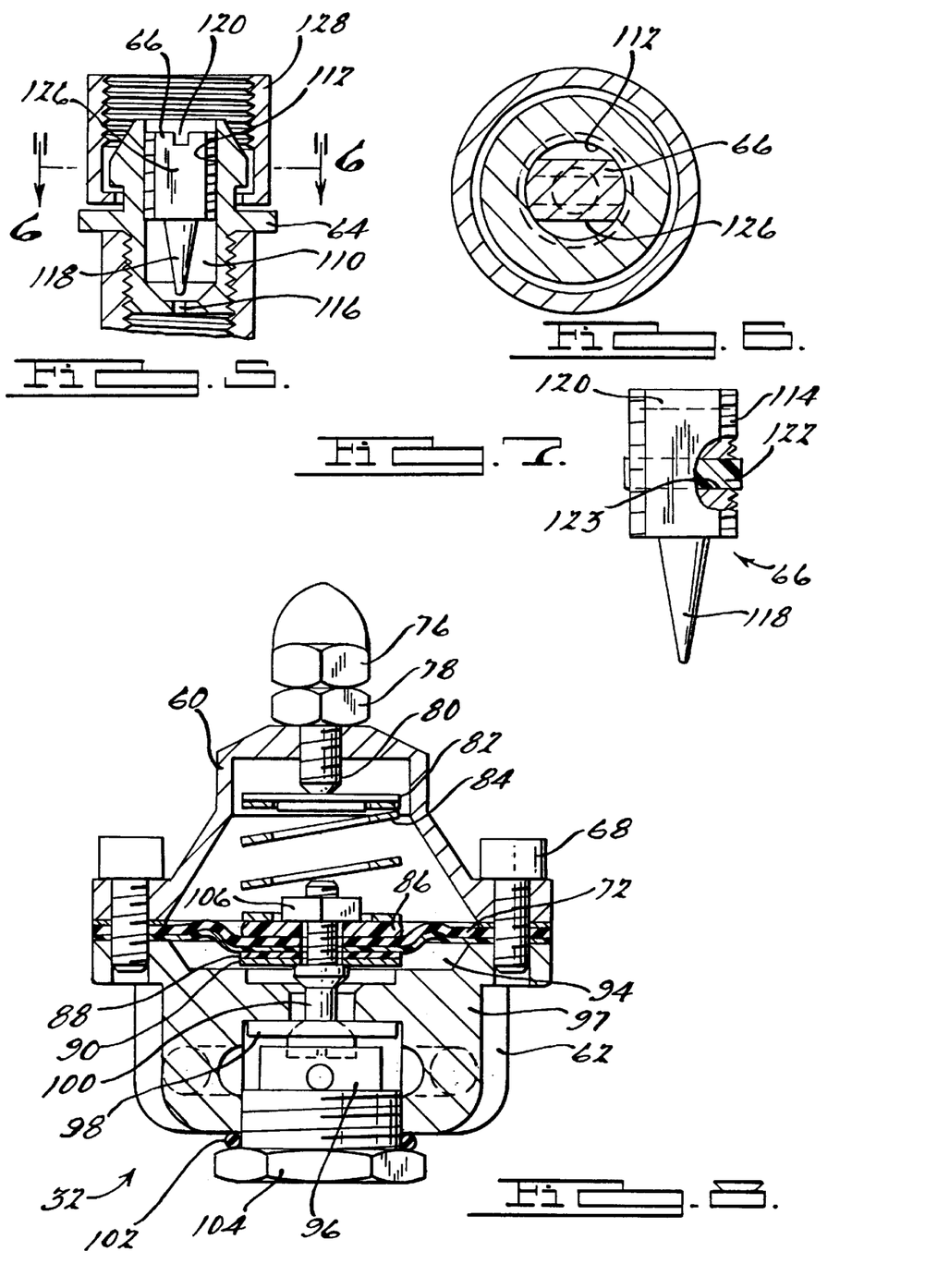
FIG. 5 is a cross-sectional view of a flow restrictor portion of the spray nozzle fluid regulator and restrictor combination taken along line 5—5 of FIG. 3.
FIG. 6 is a top cross-sectional view of the flow restrictor portion of the spray nozzle fluid regulator and restrictor combination taken along line 6—6 of FIG. 5.
FIG. 7 is a side view of a needle valve used in the flow restrictor portion of the spray nozzle fluid regulator and restrictor combination.
FIG. 8 is a side cross-sectional view of the spray nozzle fluid regulator and restrictor combination taken along line 8—8 of FIG. 3.

The fluid restrictor portion 63 defined by the fluid restrictor body 64 defines an elongated axial chamber 110 having a threaded sidewall portion 112. The threaded sidewall portion 112 threadably engages a threaded sidewall 114 of the needle valve 66 to adjustably control the flow rate of fluid through an outlet opening 116. The needle valve 66, as shown best in FIGS. 6 and 7 includes the threaded sidewall portion 114 extending axially along a length of the valve needle 66 and a tapered needle portion 118 adapted to be disposed with the tapered end portion in adjustable flow obstruction relationship relative to the outlet opening 116. The axis of the tapered needle portion 118 of the needle valve 66 is disposed in substantial axial alignment with the axis of the outlet opening 116, such that inward or outward threaded adjustment of the needle valve 66, provides for corresponding adjustment in the amount of liquid coating composition passing outwardly through outlet port 58. For example, the needle valve 66 is operable to control a flow rate of liquid coating composition or paint between the ranges of about 1 to about 60 ounces per minute when the regulated outlet or spray pressure is between about 2 psi to about 100 psi.

A transverse slot 120 enables engagement by means of a screwdriver or other appropriate device, to permit axial adjustment within the axial chamber 110. Inadvertent movement of the needle valve 66 relative to the threaded sidewall 112 is restricted by means of a deformable slug 122, such as a nylon plastic, which is disposed in an interfering relationship between the threaded sidewall 112 and threaded sidewall 114 to provide therewith a thread drag. This slug 122 is bonded or mechanically interlocked within an appropriate bore 123 formed in the body of the needle valve 66. To provide for flow passages, recess surfaces 126 in the form of axially extending planes corresponding to opposed sides of the needle valve 66 are positioned parallel to one another, as shown best in FIG. 6. The corresponding clearance provided between the flat surfaces 126 and the inner threaded sidewall 112 provides channels for passing the liquid coating composition to the outlet port 58. Also extending from the outlet port 58 is a rotatable nut 128 which threadably couples to the remaining spray assembly. The internal portion of the restrictor body 64 and needle valve 66 are preferably substantially similar to that disclosed in U.S. Pat. No. 4,106,699, which is hereby incorporated by reference.

In operation and use, the fluid regulator and restrictor combination 32 enables both pressure and flow rate control in a single unitary device or assembly that is positioned substantially adjacent to the spray gun 30. The typical supply header 18 line pressures observed by this fluid regulator and restrictor combination 32 ranges between about 50 psi to about 300 psi with a desired regulated output or spray pressure range being between about 2 psi to about 100 psi at a desired output flow rate between about 1 to about 60 ounces per minute. To adjust the desired pressure, the adjustment needle 80 is rotated either clockwise or counterclockwise to increase or decrease the regulated fluid pressure rate, respectively. Likewise, to adjust the flow rate, the needle valve 66 is rotated clockwise to decrease the flow rate and rotated counterclockwise to increase the flow rate.

Preferably, the needle valve 66 is adjusted such that the outlet opening 116 has a smaller passage than the spray nozzle of the spray gun 30. This causes or creates a back pressure between the regulator portion 59 and the restrictor portion 63. Specifically, the back pressure occurs in the supply cavity 94 to apply an upward force or an opposing spring force on the flexible diaphragm 72. This causes the diaphragm 72 to operate in a more stable manner as a trigger 130 of the spray gun 30 is actuated on and off. In other words, because the diaphragm 72 is formed from teflon, which is substantially non-responsive, this added back pressure between the diaphragm 72 and the wall 97 enables the diaphragm 72 to move much quicker upon release of the trigger 130 on the spray gun 30 to quickly close the inlet opening 92. This increased closure rate substantially reduces or eliminates a build up of in-line pressure between the regulator and restrictor combination 32 and the spray gun 30, such that when the trigger 130 is again actuated on the spray gun 30, substantially all of the initial paint exiting the spray gun 30 is appropriately atomized.

In contrast, should a conventional pressure regulator be used, upon releasing the trigger 130 of the spray gun 30, the substantially non-responsive teflon diaphragm 72 will not react as quickly since there is no back pressure created at the outbound side of the regulator or within the supply cavity 94. This causes the pressure regulator to not shut off quickly and, in general, the pressure regulator may remain somewhat open, such that the pressure between the pressure regulator and the spray gun 30 may increase up to the high supply line pressure. In this case, upon actuating the trigger 130 of the spray gun 30, a column of non-atomized paint exits the spray gun 30 until the diaphragm 72 is able to operate and stabilize to reduce the line pressure to the desired regulated pressure.

Should a conventional flow restrictor be used adjacent to the spray gun 30, similar problems are also exhibited. In this regard, since a conventional flow restrictor does not have any closure mechanism, upon releasing the trigger 130 of the spray gun 30, the pressure of the fluid between the flow restrictor and the spray gun 50 rises essentially to the high supply line pressure. In which case upon initially actuating the trigger 130, a stream or spit of non-atomized paint again exits the spray gun 30.

Alternatively, should a separate pressure regulator be used at the bulk head of the spray station with a separate flow restrictor used adjacent to the spray gun 30, upon releasing the trigger 130 of the spray gun 30, the pressure regulator is not capable of providing a quick response, since the flow restrictor is located substantially away from the pressure regulator, generally in the range of about 25 feet, which does not provide for the needed back pressure to provide this quick diaphragm response. Therefore, the pressure regulator generally will again not close quickly and fully, such that the paint between the pressure regulator and the spray gun, which may be approximately 25 feet long, is at the high supply line pressure. Once the trigger 130 is again actuated, this large column of paint exits the spray gun 30 in an non-atomized manner, thereby degrading paint surfaces, as well as wasting paint. Accordingly, by providing the regulator substantially adjacent to the restrictor in a single unit or assembly which is mounted substantially adjacent to the spray gun 30, the disadvantages associated with conventional systems are eliminated.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A fluid regulator and restrictor combination for controlling fluid supplied to a spray nozzle used in a fluid supply system, said fluid regulator and restrictor combination comprising:

a pressure regulator portion operable to control a fluid pressure of the fluid supplied to the spray nozzle; and a fluid restrictor portion operable to control a flow rate of the fluid supplied to the spray nozzle, said pressure regulator portion and said fluid restrictor portion formed as a single assembly with said fluid restrictor portion being positioned substantially adjacent to said pressure regulator portion, wherein said fluid restrictor portion increases overall responsiveness of said pressure regulator portion.

2. The fluid regulator and restrictor combination as defined in claim 1 wherein said pressure regulator portion includes a flexible diaphragm, a valve coupled to said flexible diaphragm and an adjustment mechanism operable to adjust the fluid pressure of the fluid supplied to the spray nozzle.

3. The fluid regulator and restrictor combination as defined in claim 2 wherein said adjustment mechanism includes an adjustment screw and an adjustment spring that applies an adjustable spring force on said flexible diaphragm.

4. The fluid regulator and restrictor combination as defined in claim 1 wherein said fluid restrictor portion includes a restrictor body that defines an outlet opening and a needle valve adjustably retained adjacent to said outlet opening.

5. The fluid regulator and restrictor combination as defined in claim 1 wherein said pressure regulator portion includes a supply port and a return port, said supply port operable to receive fluid and said return port operable to return excess fluid supplied to said supply port.

6. The fluid regulator and restrictor combination as defined in claim 5 wherein said fluid restrictor portion includes an outlet port operable to supply fluid to the spray nozzle, said fluid restrictor portion located downstream from said pressure regulator portion.

7. The fluid regulator and restrictor combination as defined in claim 6 wherein said fluid restrictor portion creates a back pressure between said pressure regulator portion and said fluid restrictor portion to cause a valve mechanism in said pressure regulator portion to close quickly and fully.

8. The fluid regulator and restrictor combination as defined in claim 1 wherein said pressure regulator portion includes a supply cavity and a recirculating cavity, said fluid restrictor portion creating a back pressure in said supply cavity.

9. The fluid regulator and restrictor combination as defined in claim 8 wherein said pressure regulator portion further includes a flexible diaphragm and a valve mechanism coupled relative to said flexible diaphragm, wherein said back pressure is applied to said flexible diaphragm to cause said valve mechanism to close quickly and fully.

10. A fluid regulator and restrictor combination for controlling fluid supplied to a spray nozzle used in a fluid supply system, said fluid regulator and restrictor combination comprising:

a pressure regulator portion operable to control a fluid pressure of the fluid supplied to the spray nozzle; and a fluid restrictor portion operable to control a flow rate of the fluid supplied to the spray nozzle, said pressure regulator portion and said fluid restrictor portion formed as a single assembly with said fluid restrictor portion being positioned downstream from said pressure regulator portion and substantially adjacent to said pressure regulator portion, wherein said fluid restrictor portion creates a back pressure downstream from said pressure regulator portion to increase overall responsiveness of said pressure regulator portion.

11. The fluid regulator and restrictor combination as defined in claim 10 wherein said pressure regulator portion includes a supply cavity and a recirculating cavity with a supply valve positioned therebetween, said back pressure formed within said supply cavity to assist in quickly and fully closing said supply valve.

12. The fluid regulator and restrictor combination as defined in claim 11 wherein said supply cavity includes a flexible diaphragm coupled to said supply valve, said back pressure acting on said flexible diaphragm to assist in closing said supply valve.

13. The fluid regulator and restrictor combination as defined in claim 12 wherein said fluid restrictor portion includes a needle valve adjustably positioned within a flow control cavity having an outlet opening, said outlet opening in communication with said supply cavity.

14. The fluid regulator and restrictor combination as defined in claim 13 wherein said needle valve is adjusted, whereby said outlet opening is smaller than an opening in the spray nozzle to create said back pressure.

15. A recirculating fluid supply system for supplying fluid to a spray nozzle, said recirculating fluid supply system comprising:

a supply line operable to supply fluid to the spray nozzle;

a return line operable to return excess fluid supplied to the spray nozzle; and a fluid regulator and restrictor combination having, a supply port in communication with said supply line, said supply port operable to receive fluid in excess of that supplied to the spray nozzle, a return port in communication with said return line, said return port operable to return excess fluid supplied to the spray nozzle, an outlet port in communication with the spray nozzle, said outlet port operable to supply fluid to the spray nozzle, a pressure regulator portion in communication with said supply port and said return port, said pressure regulator portion operable to control a fluid pressure of the fluid supplied to the spray nozzle; and a fluid restrictor portion in communication with said pressure regulator portion and said outlet port, said fluid restrictor portion operable to control a flow rate of the fluid supplied to the spray nozzle, said pressure regulator portion and said fluid restrictor portion formed as a single assembly with said fluid restrictor portion being positioned downstream from said pressure regulator portion and substantially adjacent to said pressure regulator portion, wherein said fluid restrictor portion creates a back pressure between said pressure regulator portion and said fluid restrictor portion that increases overall responsiveness of said pressure regulator portion.

16. The recirculating fluid supply system as defined in claim 15 further comprising a swivel connector assembly in communication with said outlet port.

17. The recirculating fluid supply system as defined in claim 15 further comprising a quick disconnect assembly in communication with said outlet port.

18. The recirculating fluid supply system as defined in claim 15 further comprising a filter assembly in communication with said outlet port.

19. The recirculating fluid supply system as defined in claim 15 further comprising a plurality of fluid supply stations, each including a supply line, a return line, and a spray nozzle.

20. The recirculating fluid supply system as defined in claim 15 wherein said pressure regulator portion includes a supply cavity and a recirculating cavity with a supply valve positioned therebetween, whereby said fluid restrictor portion creates said back pressure in said supply cavity to close said supply valve.

* * * * *